March 29, 1966  E. L. REIBOLD  3,243,002
BATH SCALE ASSEMBLY AND FRAME UNIT THEREFOR
Filed July 6, 1964  2 Sheets-Sheet 1

INVENTOR.
ELMER L. REIBOLD
BY John S. O'Brien
ATTORNEY

March 29, 1966 E. L. REIBOLD 3,243,002
BATH SCALE ASSEMBLY AND FRAME UNIT THEREFOR
Filed July 6, 1964 2 Sheets-Sheet 2

INVENTOR.
ELMER L. REIBOLD
BY John S. O'Brien
ATTORNEY

United States Patent Office 3,243,002
Patented Mar. 29, 1966

3,243,002
BATH SCALE ASSEMBLY AND FRAME UNIT THEREFOR
Elmer L. Reibold, Park Ridge, Ill., assignor to E. L. Reibold Agency, Inc., Chicago, Ill., a corporation of Illinois
Filed July 6, 1964, Ser. No. 380,310
4 Claims. (Cl. 177—180)

This invention relates to a bath scale assembly and to a frame unit for incorporation in the assembly. More particularly, the invention relates to an assembly of a bath scale or the like, a scale cover, and a frame unit securing the cover in place on the scale.

An important object of the invention is to provide a novel functional and decorative bath scale assembly embodying an exposed scale cover which is secured in place around the scale periphery by a frame unit.

Another object is to provide a bath scale assembly embodying a comfortable and attractive scale cover which may be removed for cleaning or for replacement by a cover of another type, pattern or color.

An additional object is to provide a bath scale assembly of the foregoing description which is easily and rapidly assembled and disassembled. A particular object is to provide a bath scale assembly wherein the frame unit snaps on the bath scale to securely hold the assembly together and also may be removed conveniently when desired.

Another object is to provide a bath scale assembly embodying a ring secured to the scale for suspending the assembly thereby.

An additional object is to provide a frame unit for assembly with a bath scale or the like, such as a conventional bath scale, to accomplish the foregoing objects.

A more particular object is to provide such a frame unit including an open frame for encompassing the periphery of the platform of a platform bath scale, the frame extending inwardly for overlying only the peripheral upper surface of the scale platform, and snap means on the frame removably engageable with the scale platform for securing the frame thereto and clamping the periphery of a platform cover in place between the frame and the platform.

These and other objects, advantages and functions of the invention will be apparent on reference to the specification and to the attached drawings, wherein like parts are identified by like reference symbols in each of the views, and wherein.

Figure 1:
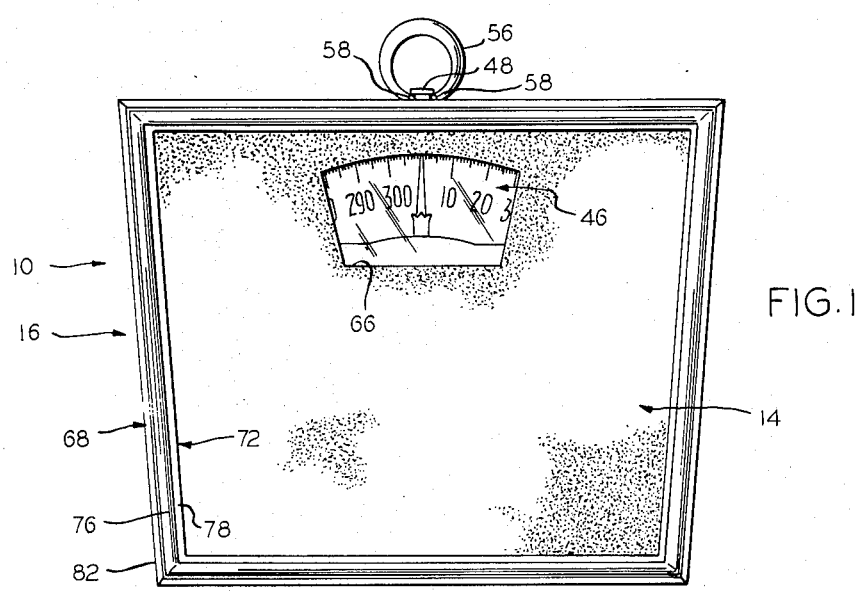
FIGURE 1 is a top plan view of a preferred embodiment of the bath scale assembly.
Figure 2:
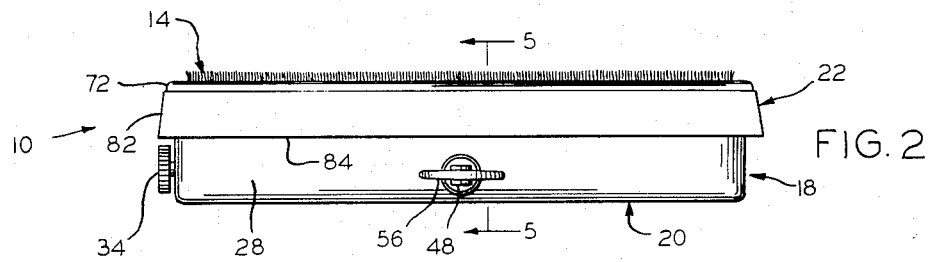
FIG. 2 is a rear side elevational view thereof.
Figure 3:
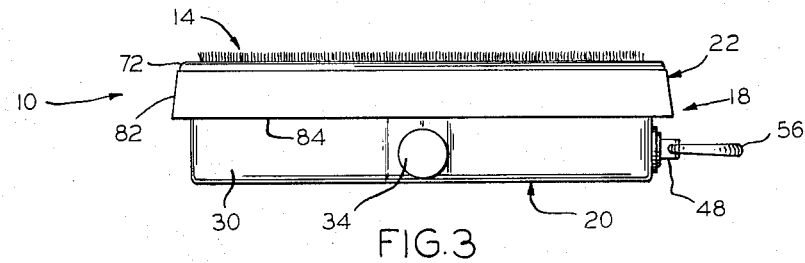
FIG. 3 is a right side elevational view thereof.
Figure 4:
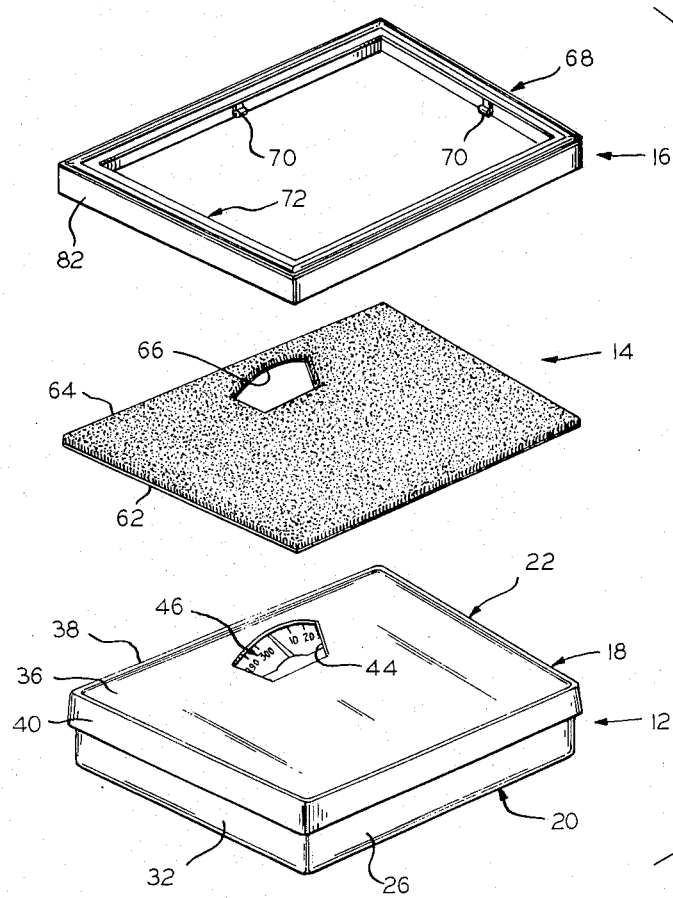
FIG. 4 is an exploded perspective view thereof.

Referring to the drawings, a bath scale assembly 10 represents a preferred embodiment of the invention. The assembly includes a platform scale 12, a platform cover 14, and a frame unit 16. The cover is mounted on the upper surface of the scale. The frame unit is mounted on the scale and secures the periphery of the cover between it and the scale while exposing the remaining upper surface of the cover to contact with the user's feet.

The scale 12 may be a conventional portable platform scale having a low silhouette. The scale includes a housing 18 formed of a hollow casing 20 and a platform 22. The casing includes a bottom wall 24 and integral upright front, back, right side, and left side walls 26, 28, 30 and 32, respectively. A conventional scale mechanism, not shown, is mounted in the casing. An adjusting knob 34 is mounted on the right side wall 30 and is connected to the mechanism for adjusting the scale setting.

The platform 22 is mounted on the scale mechanism in a conventional manner for transmitting the weight of a body on the platform to the mechanism. The platform is mounted in spaced relation above the casing 20 for downward movement relative thereto in response to the weight of a body. The platform includes a horizontal quadrilateral substantially flat top 36 having an integral upwardly extending continuous peripheral curved bead 38. The platform also includes an integral continuous peripheral skirt 40 depending from the top therearound. The upright walls of the casing are received within the platform skirt, and the skirt is spaced outwardly from the walls. A glass-covered viewing opening 44 is provided in the top 36, centrally between the side margins and adjacent to the rear margin thereof. A conventional dial 46 is visible through the viewing opening, and it is connected to the scale mechanism for indicating the weight of a body on the platform.

The casing 20 and the platform 22 are suitably constructed by stamping or bending from relatively rigid sheet or plate metal stock. A feature of the invention is the provision of structure for suspending or hanging the scale assembly with the scale as thus constructed. As seen most clearly in FIG. 5, a threaded stud 48 is mounted on the back wall 28 of the casing. The stud extends through the wall and through external and internal washers 50 and 52, and the stud is secured by an internal nut 54. A ring 56 is pivotally mounted on the stud and extends outwardly from the wall. The ring is provided with stop pins 58, and stop shoulders 60 are formed on the stud. The pivotal movement of the ring is limited by engagement of the pins with the shoulders, so that the ring is supported in an outwardly extending position when the bottom wall 24 of the casing is supported on a horizontal surface.

The bath scale assembly 10 may be suspended from a hook or other suitable means mounted on a wall, a cabinet or other appropriate support. The scale assembly constitutes a decorative as well as a functional household accessory, as will appear from the subsequent description, so that the assembly may be hung in any desirable location while providing a pleasing decorative effect. For this reason, the stud 48, the external washer 50, and the ring 56 are constructed as ornamental members while performing the support function.

The platform cover 14 may be made from any desired covering material, such as fabric, sheet material having a friction surface, and the like. The preferred illustrative embodiment features a deep pile fabric layer which is both functional and decorative. The fabric layer includes a cloth foundation or backing sheet 62 and a multitude of raised pile filaments or threads projecting upwardly therefrom to provide a uniform pile thickness. The fabric pile imparts softness and warmth, instead of the hardness and coldness of metal, plastic, and other prior surface materials. The pile fabric also imparts a very pleasing ornamental appearance to the scale assembly, which may be selected to enhance the decor of the room. Thus, the style, pattern, and color of the fabric may be selected to match or complement the color scheme of the room and other accessories in the room. The fabric is readily cleaned and may be replaced conveniently and economically at any time it may be desired to change the appearance or in the event it becomes worn or damaged.

Figure 5:
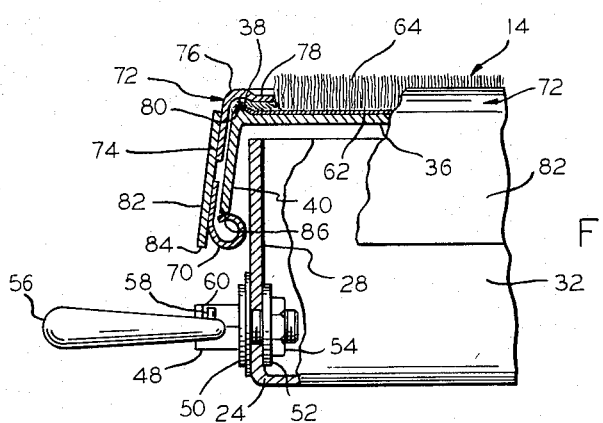
FIG. 5 is an enlarged fragmentary vertical sectional view thereof, taken substantially on line 5—5 of FIG. 2.

The platform cover 14 has the same or substantially the same dimensions and configuration as the platform top 36. A window opening 66 is formed in the cover, and it registers with the viewing opening 44 in the top when the cover is in place. As illustrated in FIG. 5, the periphery of the cover overlies the peripheral bead 38 on the top around the platform.

The frame unit 16 includes a quadrangular frame 68 and a plurality of snap rings or fasteners 70 secured thereto. The frame includes a rim or border 72 encompassing the periphery of the scale platform 22. The rim extends inwardly and overlies the periphery of the platform top 36 and of the platform cover 14 thereon. The rim also extends downwardly over the platform skirt 40. The rim structure includes a downwardly extending peripheral band 74, an integral upper peripheral concavo-convex ridge 76, and an integral inwardly extending annular flat strip 78. The ridge defines an inner peripheral curved groove 80 which is complementary to the platform bead 38.

The frame also includes a depending skirt 82 on the outer surface of the rim band 74 and secured thereto by suitable means, such as welding. The frame skirt overlies the platform skirt 40 therearound, and the frame skirt extends downwardly beyond the platform skirt when assembled. The lower peripheral edges 84 of the frame skirt thus are spaced below the peripheral edges 86 of the platform skirt. The frame skirt edges are also spaced above the adjusting knob 34 and the stud 48 to allow for downward movement of the frame unit with the platform.

A snap ring 70 is secured to the inner surface of each of the four sides of the frame skirt 82, approximately medially of the side margins thereof, by suitable means such as welding. The illustrative rings are constructed as inwardly and upwardly bent curved strips which are resiliently flexible. The frame skirt 82 is constructed so that it may flex transversely and the snap rings flex in the process of assembling and disassembling the frame unit on the platform. The frame unit is mounted simply by pushing it on the platform. The frame skirt flexes and the snap rings slide over the platform skirt, until the rings are substantially below the peripheral edges 86 of the platform skirt, whereupon the rings snap into the positions illustrated in FIG. 5. At this time, the frame unit is securely held in place on the platform on all four sides. The frame unit may be removed from the platform merely by spreading the sides of the flexible frame skirt 82 sufficiently to disengage the snap rings from the edges of the platform skirt, and then lifting the unit off of the platform.

The bath scale assembly 10 is assembled by placing the platform cover 14 on the platform top 36 with the periphery of the cover overlying the platform bead 38 therearound. The frame unit 16 then is placed over the cover and mounted on the platform, as described above. The periphery of the cover is clamped in place on the platform by the frame unit, between the rim 72 and the platform top 36. In particular, the cover is clamped between the frame ridge 76 and the platform bead 38, and also between the frame strip 78 and the adjoining upper surface of the platform top. The cover is tightly held in place so as to resist displacement on the platform.

The frame unit 16 is well adapted to serve as a decorative adjunct to the scale and the platform cover. It may be provided with an ornamental design and surface finish matching the stud 48 and the ring 56. Thus, for example, it is very advantageous to construct the frame skirt 82 of a filigree strip which is both decorative and flexible. Similarly, the rim 72 may be provided with attractive ornamentation and a decorative finish. As seen on reference to FIG. 1, the resulting bath scale assembly presents a very attractive appearance while being eminently functional.

While preferred embodiments of the bath scale assembly and its components have been illustrated and described, it will be apparent that various changes and modifications may be made therein within the spirit and scope of the invention. It is intended that such changes and modifications be included within the scope of the appended claims.

I claim:

1. A bath scale assembly or the like which comprises, in combination, a platform scale casing, a platform on said casing, a platform cover on the upper surface of said platform, an open frame encompassing the periphery of said platform, complementary bead and groove means on said frame and platform respectively for receiving the periphery of said cover therebetween, and means removably securing said frame to said platform whereby the periphery of said cover is clamped in place between said bead and groove means, the central portion of the upper surface of said cover being exposed to contact with the user's feet.

2. A bath scale assembly as defined in claim 1 wherein said securing means comprises snap means on said frame removably engageable with said platform.

3. A bath scale assembly or the like which comprises, in combination, a platform scale casing and a platform movable thereon, said platform including a top and a peripheral skirt, a pile fabric layer on the upper surface of said platform top, an open frame encompassing the periphery of said platform, said frame including a rim extending inwardly to overlie only the periphery of said fabric layer, thereby exposing the remaining upper surface of said layer to contact with the user's feet, said frame also including a peripheral skirt overlying said platform skirt, complementary peripheral bead and groove means on said rim and said platform top respectively for receiving the periphery of said fabric layer therebetween, and a plurality of snap rings mounted on said frame skirt at spaced locations therearound and removably engageable with the peripheral edges of said platform skirt to secure the frame to the platform and clamp the periphery of said fabric layer in place between said bead and groove means.

4. A frame unit for assembly with a bath scale or the like having a platform which includes a top and a peripheral skirt, which comprises an open frame adapted for encompassing the periphery of such platform of a platform bath scale, said frame including a rim extending inwardly for overlying only the peripheral surface of the platform top and a peripheral skirt for overlying the platform skirt, groove means on said rim for registering with complementary bead means on such platform top for receiving the periphery of a platform cover therebetween, and a plurality of snap rings mounted on said frame skirt at spaced locations therearound and removably engageable with the peripheral edges of the platform skirt for securing the frame to the platform and clamping the periphery of a platform cover in place between said groove means and said bead means with the remaining upper surface of said cover exposed to contact with the user's feet.

References Cited by the Examiner

UNITED STATES PATENTS

| | | | |
|---|---|---|---|
| 813,735 | 2/1906 | Paquette | 177—234 |
| 1,224,891 | 5/1917 | Baum | 160—380 |
| 1,987,860 | 1/1935 | Milone | 160—395 |
| 2,760,301 | 8/1956 | Derr et al. | 168—383 |
| 2,770,002 | 11/1956 | Thompson | 160—395 X |
| 3,097,966 | 7/1963 | Provi | 177—244 X |
| 3,128,838 | 4/1964 | Monk | 177—181 |

LEO SMILOW, *Primary Examiner.*